United States Patent
Xu et al.

(10) Patent No.: US 9,888,457 B2
(45) Date of Patent: Feb. 6, 2018

(54) SINGLE-FREQUENCY NETWORK (SFN) OPERATION FOR MACHINE-TYPE COMMUNICATIONS (MTC) COVERAGE ENHANCEMENTS

(71) Applicant: QUALCOMM Incorporated, San Diego, CA (US)

(72) Inventors: Hao Xu, San Diego, CA (US); Tingfang Ji, San Diego, CA (US); Peter Gaal, San Diego, CA (US); Durga Prasad Malladi, San Diego, CA (US); Yongbin Wei, La Jolla, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/339,217

(22) Filed: Oct. 31, 2016

(65) Prior Publication Data

US 2017/0048821 A1    Feb. 16, 2017

Related U.S. Application Data

(63) Continuation of application No. 14/179,245, filed on Feb. 12, 2014, now Pat. No. 9,497,733.
(Continued)

(51) Int. Cl.
*H04W 72/12* (2009.01)
*H04L 5/00* (2006.01)
(Continued)

(52) U.S. Cl.
CPC ......... *H04W 72/005* (2013.01); *H04L 1/0013* (2013.01); *H04L 5/0048* (2013.01);
(Continued)

(58) Field of Classification Search
CPC . H04W 72/005; H04W 4/005; H04W 72/042; H04W 72/0446; H04W 72/1284;
(Continued)

(56) References Cited

U.S. PATENT DOCUMENTS 9,497,733 B2    11/2016    Xu et al.
2010/0061322 A1    3/2010    Kim et al.
(Continued)

FOREIGN PATENT DOCUMENTS

WO    WO 2009041775 A2 *   4/2009   .......... H04B 1/7083
WO    WO-2012116031 A1    8/2012
(Continued)

OTHER PUBLICATIONS

Bell A.L.S., et al., "Discussion on RACH design for MTC," 3GPP Draft; R2-101407, 3rd Generation Partnership Project (3GPP), Mobile Competence Centre; 650, Route Des Lucioles; F-06921 Sophia-Antipoles Cedex; France, vol. RAN WG2, No. San Francisco, USA; Feb. 22, 2010, Feb. 15, 2010 (Feb. 15, 2010), 2 pages, XP050421660, [retrieved on Feb. 15, 2010], section 2.
(Continued)

*Primary Examiner* — Melvin Marcelo
(74) *Attorney, Agent, or Firm* — Patterson & Sheridan, L.L.P.

(57) ABSTRACT

Certain aspects of the present disclosure generally relate to wireless communications and, more particularly, to techniques for single-frequency network (SFN) operation for machine-type communications (MTC) coverage enhancements. A method is provided for wireless communications by a user equipment (UE). The method generally includes detecting a synchronization signal transmitted from at least one of a plurality of transmission points, wherein each of the plurality of transmission points transmits a synchronization signal at a different offset time relative to a subframe boundary in a synchronized network, determining a subframe occurring a fixed time after detecting the synchronization signal to monitor for system information transmitted from at least one of the plurality of transmission points, and
(Continued)

RECEIVE, IN SUBFRAMES DESIGNATED FOR UEs OF A FIRST TYPE, REFERENCE SIGNALS TRANSMITTED FROM ONE OR MORE TRANSMISSION POINTS USING AT LEAST ONE ENTIRE SYMBOL IN A DOWNLINK SUBFRAME monitoring for a system information block during the determined subframe.

18 Claims, 16 Drawing Sheets

Related U.S. Application Data

(60) Provisional application No. 61/764,533, filed on Feb. 13, 2013.

(51) Int. Cl.
| | |
|---|---|
| *H04L 1/00* | (2006.01) |
| *H04W 4/00* | (2009.01) |
| *H04W 72/04* | (2009.01) |
| *H04W 72/00* | (2009.01) |
| *H04W 74/08* | (2009.01) |
| *H04W 48/12* | (2009.01) |
| H04B 7/0413 | (2017.01) |

(52) U.S. Cl.
CPC ............ *H04W 4/005* (2013.01); *H04W 48/12* (2013.01); *H04W 72/042* (2013.01); *H04W 72/0446* (2013.01); *H04W 72/1284* (2013.01); *H04W 74/0833* (2013.01); *H04B 7/0413* (2013.01)

(58) Field of Classification Search
CPC ............. H04W 74/0833; H04L 1/0013; H04L 5/0048; H04B 7/0413
See application file for complete search history.

(56) References Cited

U.S. PATENT DOCUMENTS

| | | | |
|---|---|---|---|
| 2010/0260156 | A1 | 10/2010 | Lee et al. |
| 2010/0323693 | A1* | 12/2010 | Krishnamurthy .... H04J 11/0056 455/434 |
| 2013/0039268 | A1 | 2/2013 | Blankenship et al. |
| 2013/0135984 | A1* | 5/2013 | Choi ..................... H04W 72/04 370/209 |
| 2013/0176995 | A1* | 7/2013 | Park ..................... H04W 72/06 370/336 |
| 2014/0050206 | A1 | 2/2014 | Seo et al. |
| 2015/0043491 | A1 | 2/2015 | Eng et al. |

FOREIGN PATENT DOCUMENTS

| | | |
|---|---|---|
| WO | WO-2012148236 A2 | 11/2012 |
| WO | WO-2012172314 A1 | 12/2012 |

OTHER PUBLICATIONS

Ericsson, et al., Overview of Combined Cell Deployment in Heterogeneous Networks, 3rd Generation Partnership Project (3GPP), Mobile Competence Centre; 650, Route Des Lucioles; F-06921 Sophia-Ant, vol. RAN WG1, No. St Julian; Jan. 28, 2013-Feb. 1, 2013, Jan. 19, 2013 (Jan. 19, 2013), 12 pages, XP050663863, Retrieved from the Internet< URL: http://www.3gpp.org/ftp/tsg_ran/WG1_RL1/TSGR1_72/Docs>, [retrieved on Jan. 19, 2013], sections 2 and 6.
ETRI, "Discussion on further details of Scenario 4", 3GPP Draft; R1-111000 Comp Scenario 4, 3rd Generation Partnership Project (3GPP), Mobile Competence Centre ; 650, Route Des Lucioles ; F-06921 Sophia-Antipolis Cedex ; France, vol. RAN WG1, No. Taipei, Taiwan; Feb. 21, 2011, Feb. 15, 2011 (Feb. 15, 2011) , XP050490699.
European Search Report—EP16168358—Search Authority—Munich—Jul. 15, 2016.
International Search Report and Written Opinion—PCT/US2014/016201—ISA/EPO—Aug. 21, 2014.
Mediatek Inc: "On Required System Functionalities for MTC UEs Operating in Enhanced Coverage Mode", 3GPP Draft; RI-130218 on Required System Functionalities for MTC UES Operating in Enhanced Coverage Mode, 3rd Generation Partnership Project (3GPP), Mobile Competence Centre ; 650, Route Des Lucioles vol. RAN WGI, No. St Julian; Jan. 28, 2013-Feb. 1, 2013 Jan. 19, 2013 (Jan. 19, 2013), XP050663598, Retrieved from the Internet: URL:http://www.3gpp.org/ftp/tsg_ran/WGI_RLI/TSGRI_72/Docs/ [retrieved on Jan. 19, 2013], section 2.2 System Information.
Panasonic : "Connected mode UE monitoring paging for system information change detection", 3GPP Draft; R2-082947_Connected_Mode_UE_Monitoring_Paging_for_System_Information_Change_Detection, 3rd Generation Partnership Project (3GPP), Mobile Competence Centre; 650, Route Des Lucioles; F-06921 Sophia-Antipolis Cedex; France, vol. RAN WG2, No. Sophia Antipolis,France, Jun. 2, 2008 (Jun. 2, 2008),pp. 3,XP050607856,[retrieved on Jun. 2, 2008].
Partial International Search Report—PCT/US2014/016201—ISA/EPO—Jul. 4, 2014.
Qualcomm Incorporated: "Coverage Enhancement Techniques for MTC," 3GPP Draft; R1-125120 Coverage Enhancement Techniques for MTC, 3rd Generation Partnership Project (3GPP), Mobile Competence Centre; 650, Route Des Lucioles; F-06921 Sophia-Antipolis Cedex; France, vol. RAN WG1, No. New Orleans, USA; Nov. 12, 2012-Nov. 16, 2012, Nov. 3, 2012 (Nov. 3, 2012), 7 pages, XP050662981, Retrieved from the Internet< URL: http://www.3gpp.org/ftp/tsg_ran/WG1_RL1/TSGR1_71/Docs>, [retrieved on Nov. 3, 2012], the whole document.
Qualcomm Incorporated: "Coverage enhancement techniques for MTC," 3GPP Draft; R1-130589 Coverage Enhancement Techniques for MTC, 3rd Generation Partnership Project (3GPP), Mobile Competence Centre; 650, Route Des Lucioles; F-06921 Sophia-Antipolis Cedex; France, vol. RAN WG1, No. St Julian; Jan. 28, 2013-Feb. 1, 2013, Jan. 19, 2013 (Jan. 19, 2013), 7 pages, XP050663845, Retrieved from the Internet< URL: http://www.3gpp.org/ftp/tsg_ran/WG1_RL1/TSGR1_72/Docs/>, [retrieved on Jan. 19, 2013] the whole document.

* cited by examiner

SINGLE-FREQUENCY NETWORK (SFN) OPERATION FOR MACHINE-TYPE COMMUNICATIONS (MTC) COVERAGE ENHANCEMENTS

CLAIM OF PRIORITY UNDER 35 U.S.C. §119

This is a continuation application of, and claims the benefit of priority from, U.S. patent application Ser. No. 14/179,245, filed Feb. 12, 2014, which in turn claims benefit of U.S. Provisional Patent Application Ser. No. 61/764,533, filed Feb. 13, 2013, both applications being assigned to the assignee hereof and expressly incorporated by reference herein in their entireties.

BACKGROUND

I. Field

Certain aspects of the present disclosure generally relate to wireless communications and, more particularly, to techniques for single-frequency network (SFN) operation for machine-type communications (MTC) coverage enhancements.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices comprise user equipments (UEs) and remote devices. A UE is a device that operates under direct control by humans. Some examples of UEs include cellular phones, smart phones, personal digital assistants (PDAs), wireless modems, handheld devices, tablets, laptop computers, netbooks, smartbooks, ultrabooks, etc. A remote device is a device that operates without being directly controlled by humans. Some examples of remote devices include sensors, meters, location tags, etc. A remote device may communicate with a base station, another remote device, or some other entity. Machine-type communications (MTC) refers to communication involving at least one remote device on at least one end of the communication.

SUMMARY

Certain aspects of the present disclosure provide techniques and apparatus for single-frequency network (SFN) operation for machine-type communications (MTC) coverage enhancements.

Certain aspects of the present disclosure provide a method for wireless communications, by a user equipment (UE). The method generally includes detecting at least one synchronization signal broadcasted in SFN mode from a plurality of transmission points, the at least one synchronization signal providing timing for a subframe (SF) boundary in a synchronized network; determining a subframe occurring a fixed time after detecting the synchronization signal to monitor for system information transmitted from at least one of the plurality of transmission points; and monitoring for a system information block during the determined subframe.

Certain aspects of the present disclosure provide a method for wireless communications, by a UE. The method generally includes detecting a synchronization signal transmitted from at least one of a plurality of transmission points, wherein each of the plurality of transmission points transmits a synchronization signal at a different offset time relative to a subframe boundary in a synchronized network, determining a subframe occurring a fixed time after detecting the synchronization signal to monitor for system information transmitted from at least one of the plurality of transmission points, and monitoring for a system information block during the determined subframe.

Certain aspects of the present disclosure provide a method for wireless communications, by a UE. The method generally includes receiving, in subframes designated for UEs of a first type, reference signals transmitted from one or more transmission points using at least one entire symbol in a downlink subframe.

Certain aspects of the present disclosure provide a method for wireless communications, by a UE. The method generally includes transmitting a physical uplink shared channel (PUSCH) and including, in the PUSCH, pilot symbols, wherein a number of symbols used for the pilot symbols varies based on coverage of the UE.

Certain aspects of the present disclosure provide an apparatus for wireless communications, by a user equipment (UE). The apparatus generally includes means for detecting at least one synchronization signal broadcasted in SFN mode from a plurality of transmission points, the at least one synchronization signal providing timing for a subframe (SF) boundary in a synchronized network; means for determining a subframe occurring a fixed time after detecting the synchronization signal to monitor for system information transmitted from at least one of the transmission points; and means for monitoring for a system information block during the determined subframe.

Numerous other aspects are provided including methods, apparatus, systems, computer program products, computer-readable medium, and processing systems.

DETAILED DESCRIPTION

Aspects of the present disclosure provide techniques for single-frequency network (SFN) operation for machine-type communications (MTC) coverage enhancements.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

An Example Wireless Network

Figure 1:
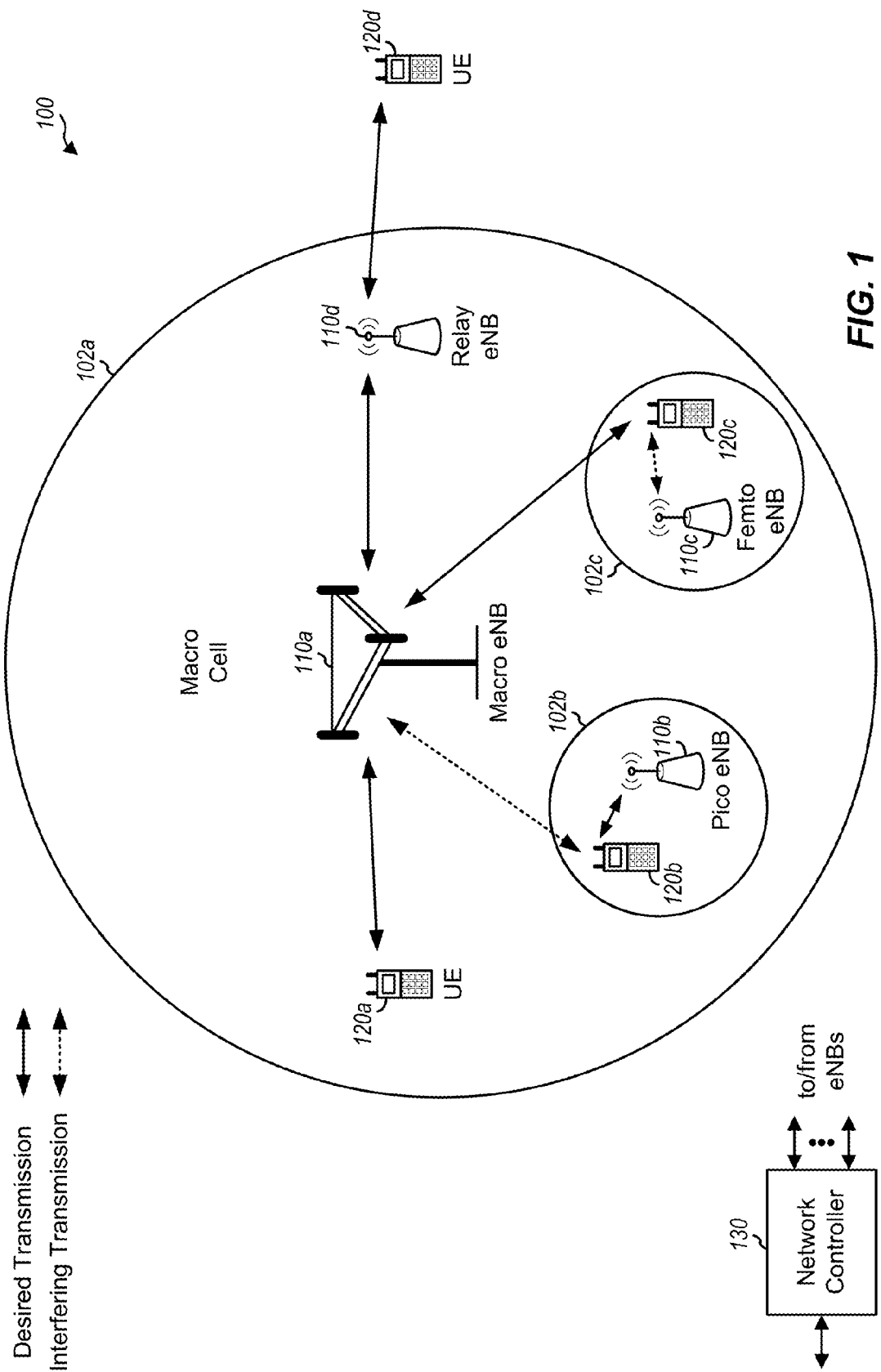
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, a transmission point, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g. directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
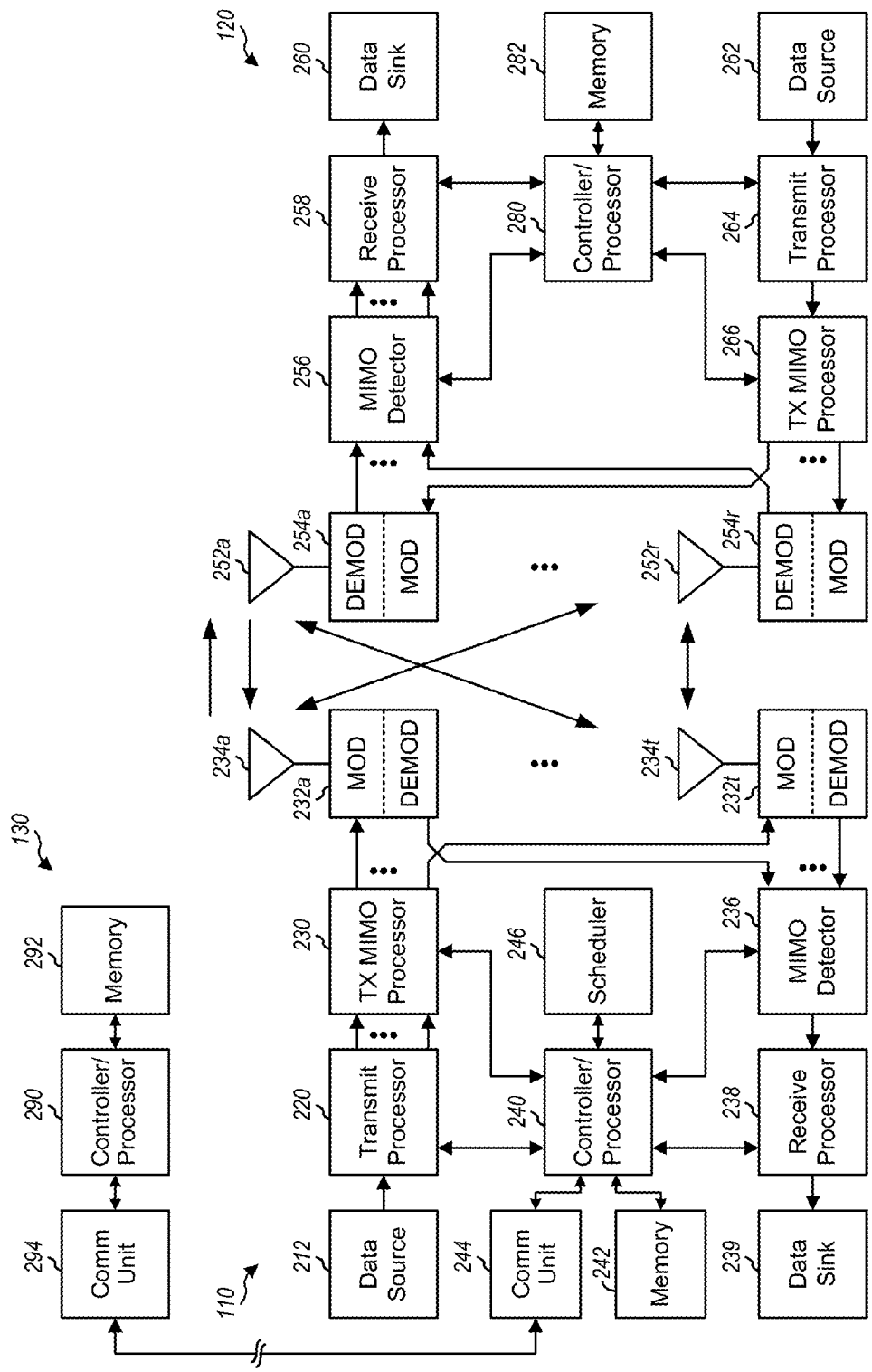
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., recoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals such as UE-RS and/or data in the resource blocks may be precoded using the same precoder. The power level used for the UE-RS in each RB (resource block) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
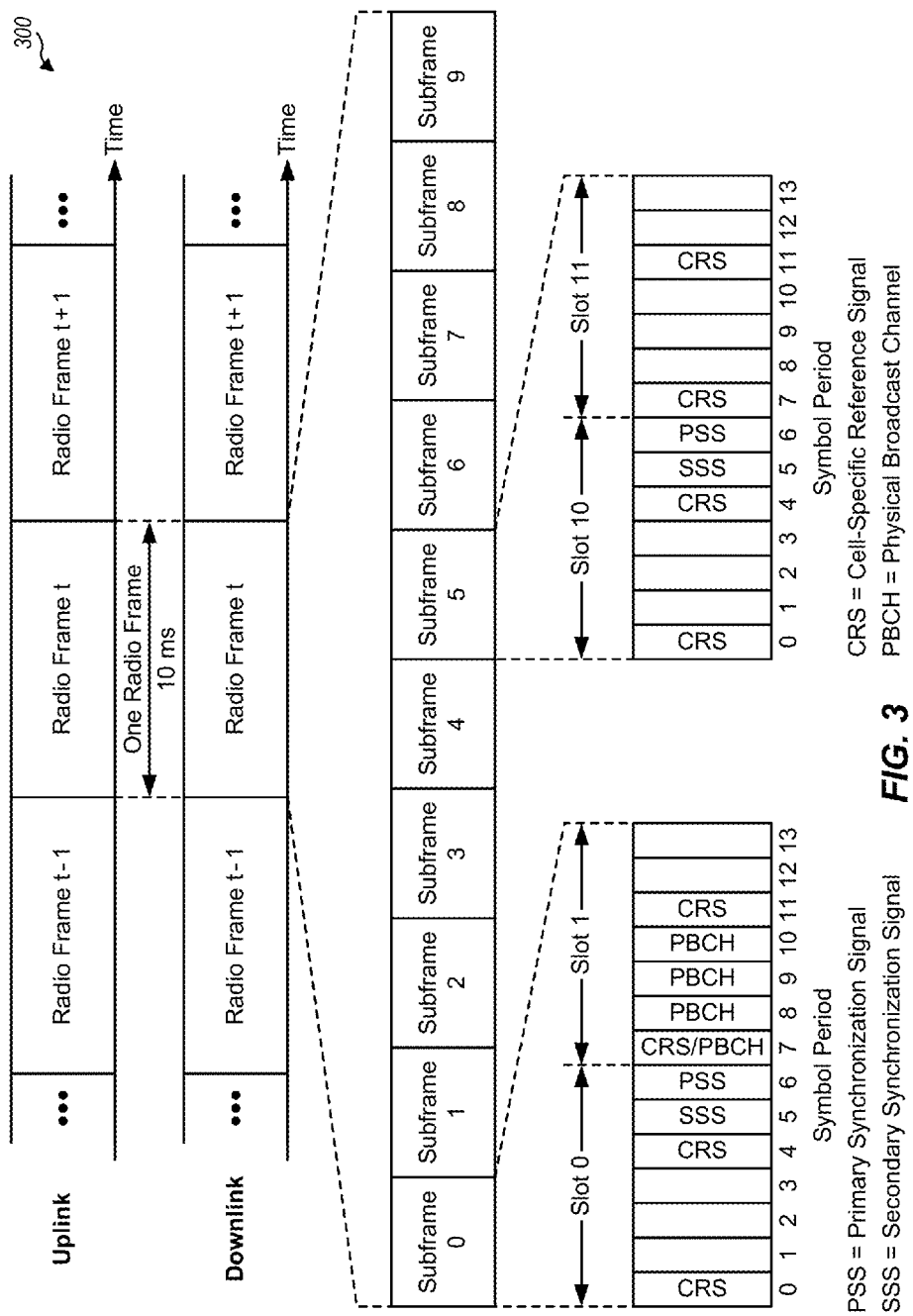
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
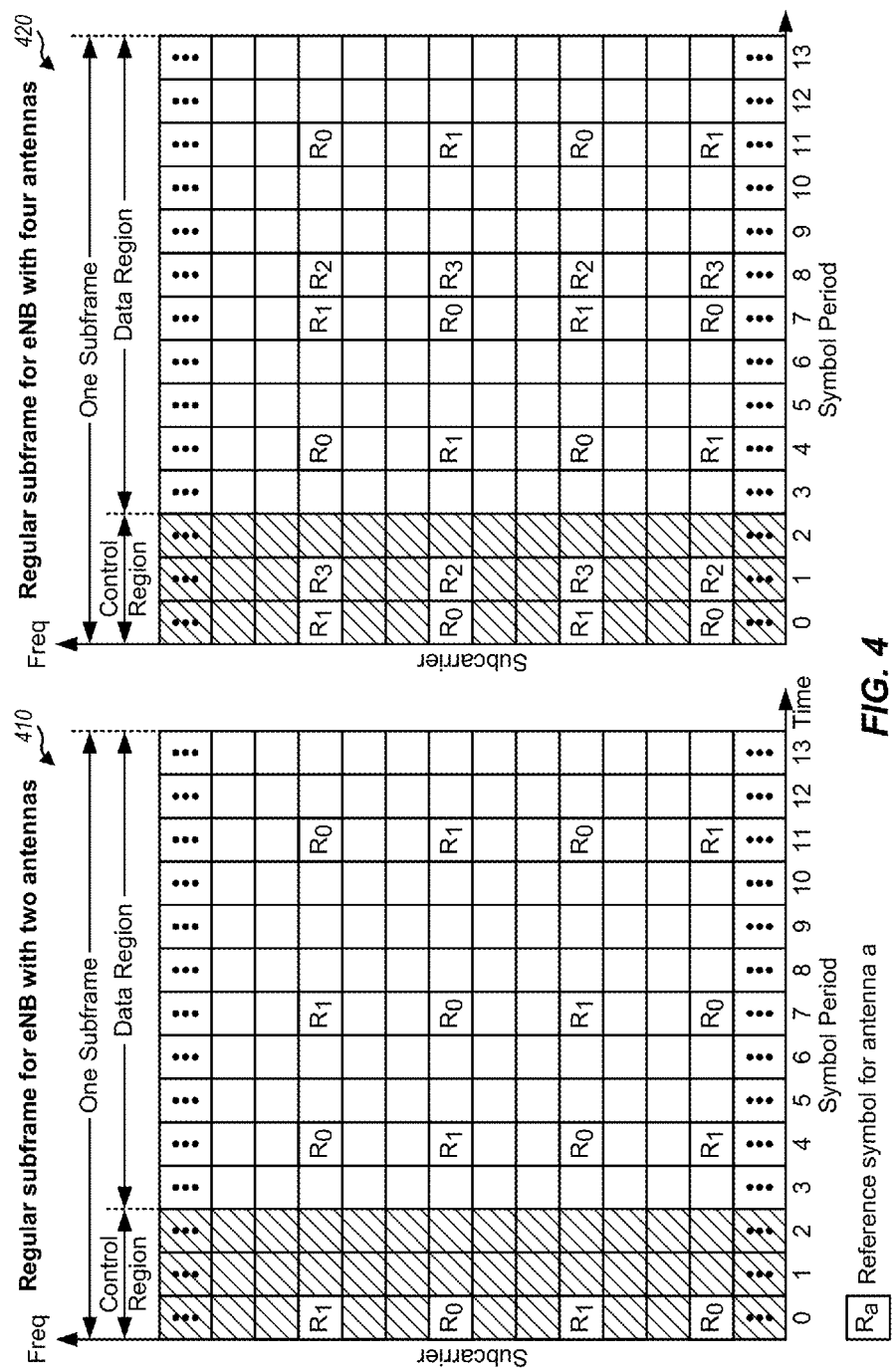
FIG. 4 is a block diagram conceptually illustrating two exemplary subframe formats with the normal cyclic prefix

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal to interference plus noise ratio (SINR), or a reference signal received quality (RSRQ), or some other metric. The UE may operate in a dominant interference scenario in which the UE may observe high interference from one or more interfering eNBs.

Example Single Frequency Network (SFN) Operation for Machine-Type Communications (MTC) Coverage Enhancements Low cost and low power operation of long term evolution (LTE) for use with machine-type communications (MTC) is desirable. In some cases, MTC devices are located in basements or other areas with significant natural shielding. To provide coverage for those types of MTC devices, a link budget of 160 dB has been considered. The 160 dB link budget is 20 dB higher than the current link budget for LTE (i.e., 140 dB link budget). Coverage enhancement techniques for LTE with MTC typically increase the power and cost, and also may have significant specification and implementation impacts.

For example, techniques to increase coverage for broadcast channels, to increase coverage for random access channel (RACH), and to set up subsequent transmission are desirable. It is possible to enhance coverage of data channels using an extended transmission time intervals (TTI), however, use of extended TTIs leads to higher power consumption and does not provide increased coverage for other channels. Primary synchronization signal (PSS) and secondary synchronization signal (SSS) have reuse, thus, in a synchronous network, simple averaging does not provide sufficient link budget gains.

Accordingly, techniques and apparatus for enhancing LTE with MTC coverage and link budget gains with minimal increase to power and cost are desirable.

Techniques are presented herein for single frequency network (SFN) operation for machine-type communications (MTC) coverage enhancements.

According to certain aspects, SFN operation may be used to enhance downlink (DL) signal coverage, for example, to enhance broadcast channel coverage. SFN operation may also be used for joint processing on the uplink (UL). For example, SFN operation may be used to increase DL transmission energy and UL reception energy. SFN operation may also be used to reduce interference from other cells on the DL and interference from other users on the UL. In aspects, cell splitting gain may be possible through regional SFN or data channel cell splitting.

It may be desirable for SFN operations for MTC coverage enhancements to be backwards compatible with legacy users and ability to co-exist with other non-MTC users (i.e., cannot transmit legacy signals in SFN from multiple cells). According to certain aspects, new channels, signals, and procedures may be designed for MTC considering backward compatibility, coverage, cost, and power consumption. In aspects, only essential channels, signals, and procedures may be used.

According to certain aspects, a synchronized network coordination across cells may be assumed. Minimum supported channels for MTC may include MTC_SYNC for synchronization, MTC_SIB_LITE for system information, MTC_RACH for access (e.g., used in performing a RACH procedure), MTC_PDCCH for persistent assignment, MTC_PDSCH for DL data transmission, and MTC_PUSCH for UL data transmission.

According to certain aspects, for the MTC_SYNC channel, signals may be transmitted in SFN mode from all cells to provide timing for the subframe boundary in the synchronized network. MTC_SYNC can be narrowband (e.g., 1 resource block (RB)) with power boost. MTC_SYNC may span multiple symbols in order to provide additional energy combining gain. In aspects, MTC_SYNC may be transmitted in an Almost-Blank Subframe (ABSF) or a New Carrier Type (NCT) subframe—where there is no legacy signal. A legacy UE may be signaled via a Multicast-Broadcast Single Frequency Network (MBSFN) subframe.

According to certain aspects, for MTC_SIB_LITE, detailed system information including system timing and virtual cell ID may be provided. In aspects, MTC_SIB_LITE may be transmitted at fixed timing with respect to MTC_SYNC. In aspects, MTC_SIB_LITE may be transmitted using cell splitting or regional SFN. In aspects, MTC_SIB_LTE may be transmitted based on an indication of actual timing of the day. In aspects, MTC_SIB_LITE may be transmitted at timing relative to the next MTC_subframe. In aspects, MTC_SIB_LITE may be transmitted at timing based on time-division duplex (TDD) configuration or configuration for half-duplex DL/UL transmissions in SIB_LITE.

According to certain aspects, for MTC_RACH (i.e., RACH message), a new MTC_RACH sequence with extended TTI may be used. The MTC_RACH may be transmitted at fixed timing after transmission of MTC_SIB_LITE. The MTC device may transmit MTC_RACH in order to access the system or trigger further DL signaling.

In aspects, multiple RACH configurations having different TTIs may be supported. The MTC-device may select an appropriate TTI bundle length for RACH based on the DL signal received from MTC_SYNC. For initial service, the longest RACH TTI may be used.

In aspects, multiple RACH configurations having different RBs may be used to signal different information (e.g., how urgent the connection setup is).

In aspects, if the new MTC_RACH is detected outside of the MTC_SF region, the MTC_RACH may be treated as MTC with initial service setup. For example, MTC_SIB_LITE may be sent to point to MTC_SF.

According to certain aspects, for MTC_PDCCH for persistent assignment, the MTC device may signal its service type and traffic requirements to the network during the initial connection setup. The UL transmission format, RB, and modulation and coding scheme (MCS) may be fixed by the spec or may be signaled from the network by default MTC_PDSCH. The serving eNode B (eNB) may provide configurations to the MTC device in the MTC_PDCCH and/or MTC_PDSCH. For example, the configurations may include DL and UL transmission formats such as number of MTC-reference signal (RS) symbols per TTI, TTI bundle size, whether to support hybrid automatic retransmission request (HARQ), transmission time, and coding type (e.g., turbo-coding (TC) or channel coding (CC).

Figure 5:
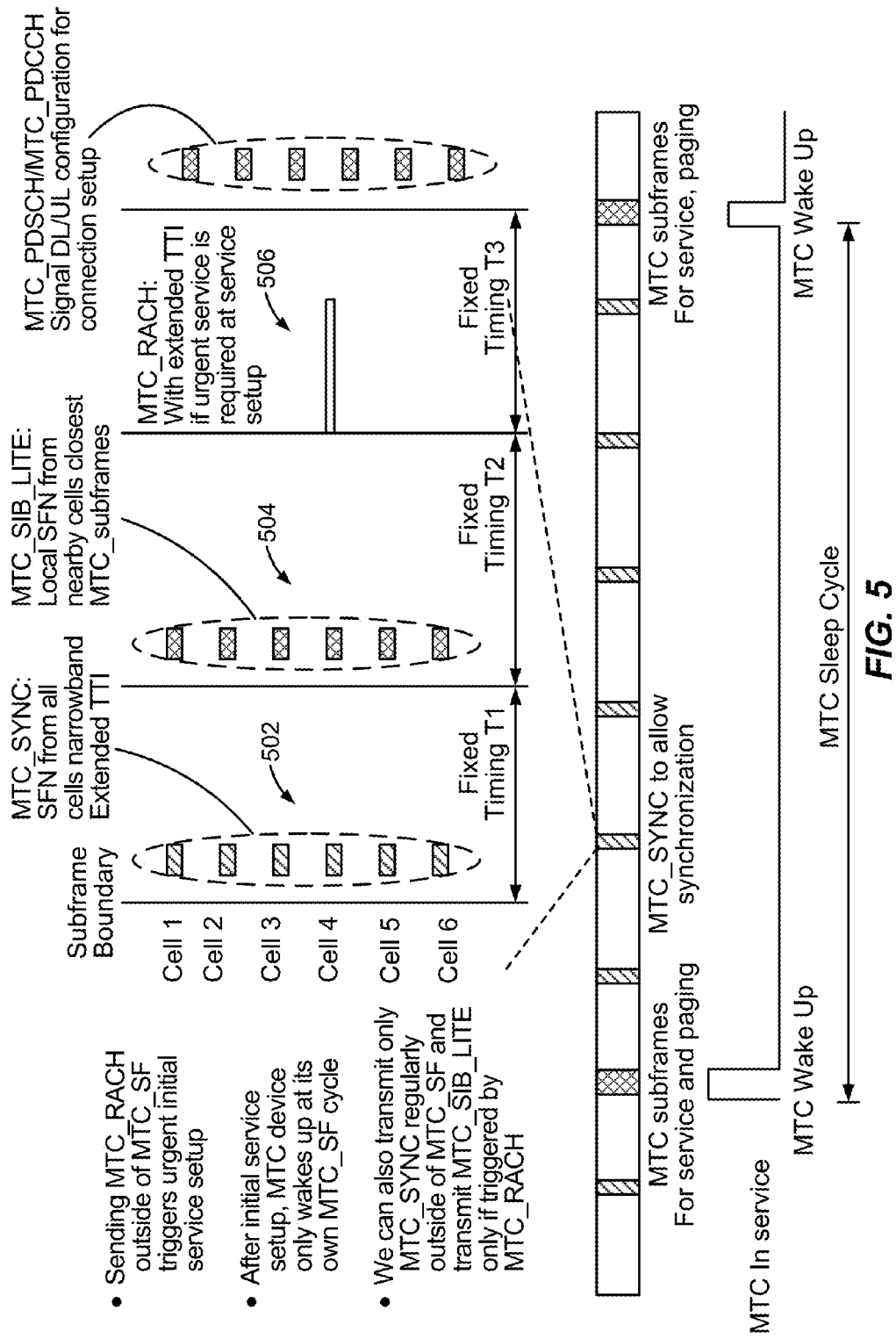
FIG. 5 illustrates example synchronization for initial service setup, in accordance with certain aspects of the present disclosure.

FIG. 5 illustrates example synchronization for initial service setup, in accordance with certain aspects of the present disclosure. As seen in FIG. 5, MTC_SYNC 502 may be transmitted with SFN from all cells (e.g., Cell 1 . . . Cell 6) with fixed timing T1. In aspects, MTC_SYNC may be transmitted using narrowband and with extended TTI. MTC_SIB_LITE 504 may be transmitted with local SFN from all nearby cells (e.g., Cell 1 . . . Cell 6) with fixed timing T2 based on the timing for MTC_SYNC 502. MTC_RACH 506 may have extended TTI and fixed timing T3. MTC_RACH 506 may be transmitted without SFN (e.g., by cell 4).

According to certain aspects, sending MTC_RACH outside of MTC_SF may trigger urgent initial service setup shown in FIG. 5. After initial service setup, the MTC device may wake up only at its own MTC_SF cycle (e.g., the MTC device wakes up only for MTC subframes). In some embodiments, only MTC_SYNC may be regularly transmitted outside of MTC_SF and MTC_SIB_LITE may be transmitted only if triggered by MTC_RACH.

Figure 6:
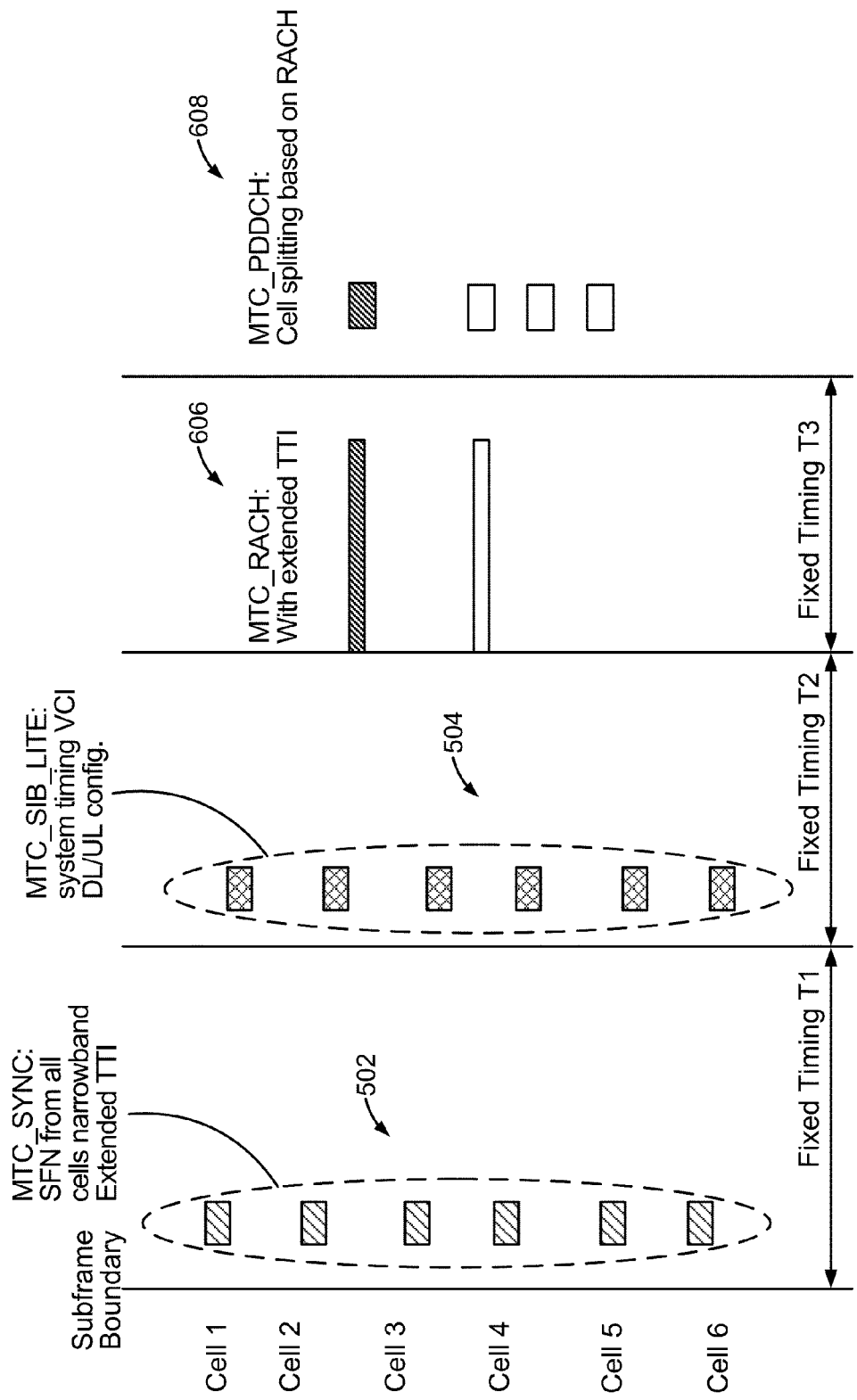
FIG. 6 illustrates example MTC_SF with MTC service setup with further cell splitting after MTC_RACH, in accordance with certain aspects of the present disclosure.

FIG. 6 illustrates example MTC_SF with MTC service setup with further cell splitting after MTC_RACH, in accordance with certain aspects of the present disclosure. As seen in FIG. 6, MTC_SYNC 502 and MTC_SIB_LITE 504 may be sent with SFN as in FIG. 5. However, MTC_RACH 606 may be split between more than one cell and MTC_PDCCH 608 may have cell splitting based on the MTC_RACH 606.

Figure 7:
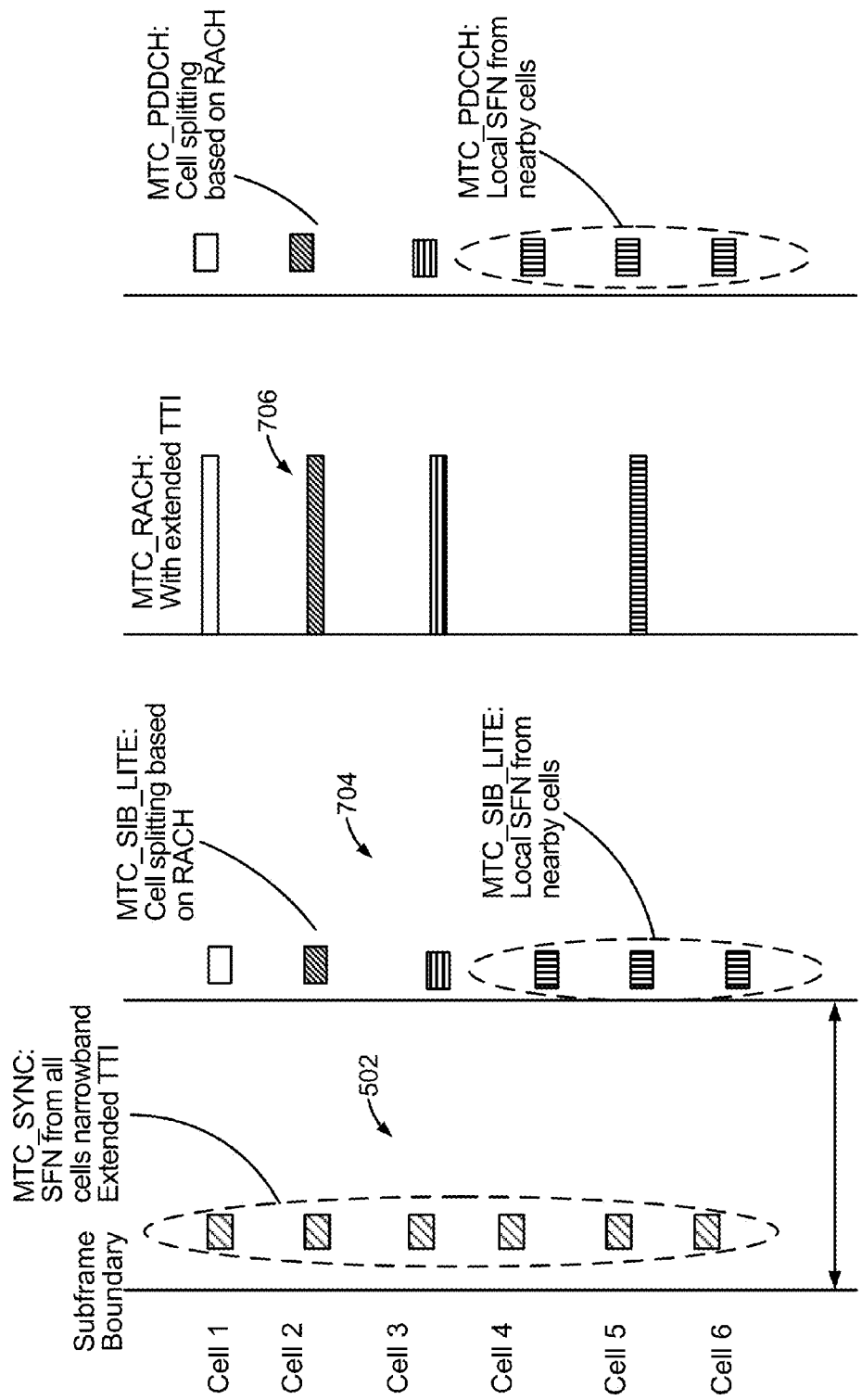
FIG. 7 illustrates example cell splitting before MTC_RACH at MTC_SIB_LITE, in accordance with certain aspects of the present disclosure.

FIG. 7 illustrates example cell splitting before MTC_RACH at MTC_SIB_LITE, in accordance with certain aspects of the present disclosure. As shown in FIG. 7, MTC_SYNC 502 may be transmitted as in FIGS. 5 and 6. According to certain aspects, MTC_SIB_LITE 704 may be transmitted with cell splitting. For example, MTC_SIB_LITE 704 may be transmitted utilizing local SFN from nearby Cells 4, 5, and 6 and also split on cells 1, 2, and 3. The cell splitting may be based on the MTC_RACH 706.

In aspects, for an MTC device which has already obtained initial system information, a fixed location MTC_SIB may be transmitted regularly (e.g., in MTC_SF). This is useful if the MTC device does not maintain precise timing; the MTC device may wake up at the regular time to search for MTC_SIB instead of RACH. The MTC_SIB can provide more information than MTC_SIB_LITE, which only serves MTC outside of MTC_SF.

In aspects, MTC_Paging may be transmitted regularly for devices which require DL paging.

Figure 8:
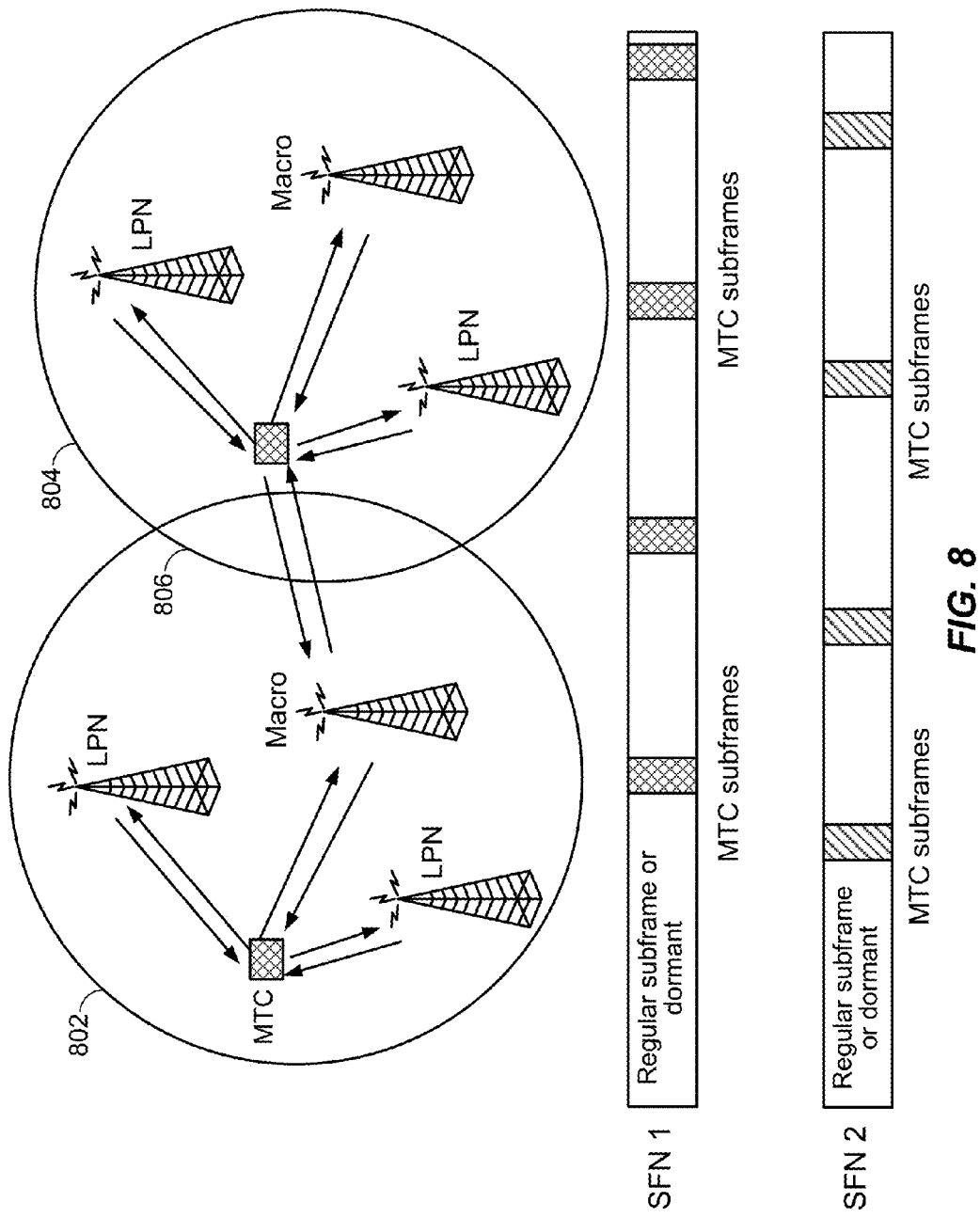
FIG. 8 illustrates an example SFN DL and joint reception UL for channels within a local SFN area, in accordance with certain aspects of the present disclosure.

FIG. 8 illustrates an example SFN DL and joint reception UL for channels within a local SFN area, in accordance with certain aspects of the present disclosure. As seen in FIG. 8, SFN areas SFN1 802 and SFN2 804 may overlap in a region 806 and may be staggered in time to allow better coverage. "LPN" represents low power node.

Figure 9:
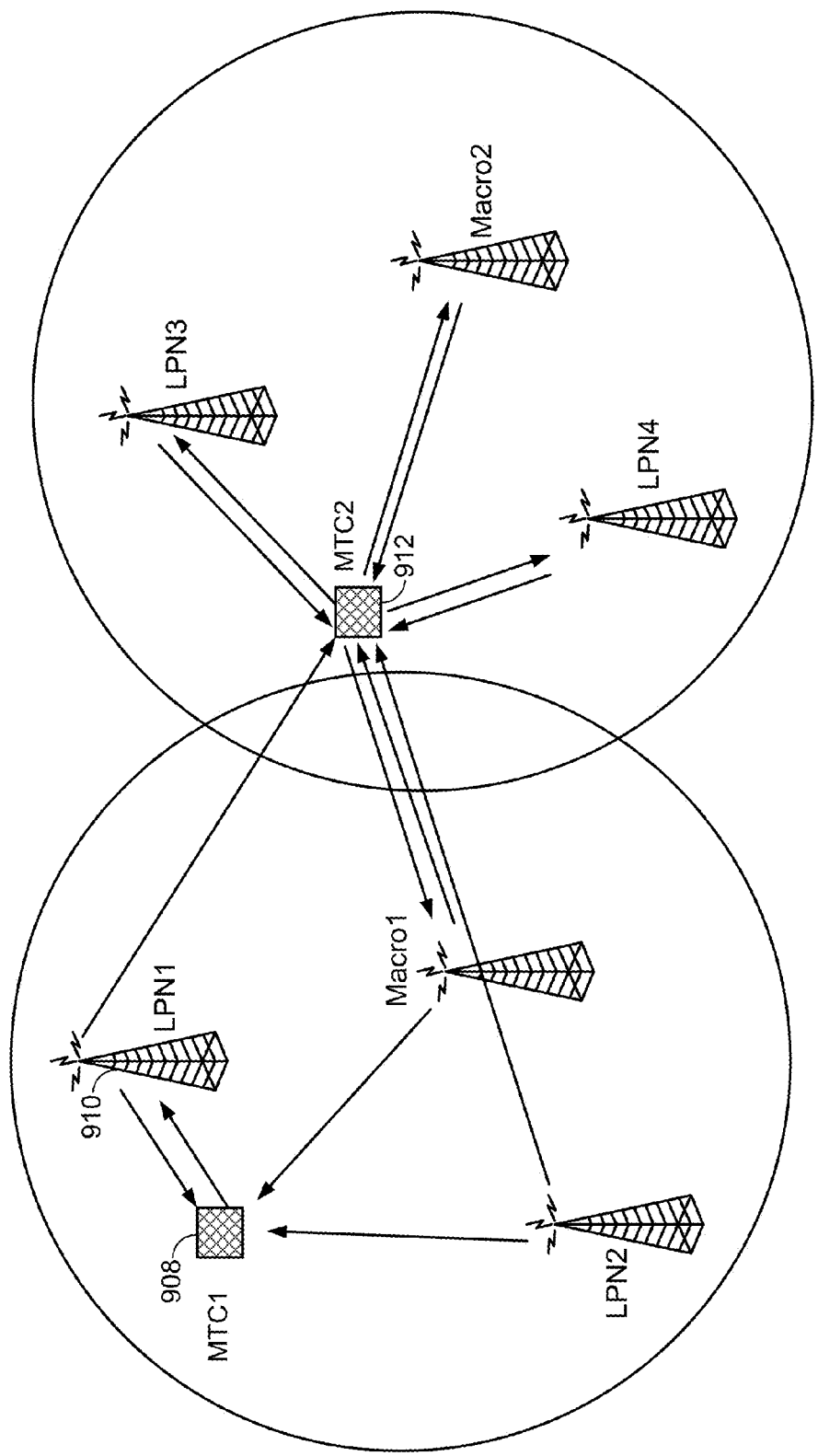
FIG. 9 illustrates example global SFN for synchronization and cell splitting for data, in accordance with certain aspects of the present disclosure.

FIG. 9 illustrates example global SFN for synchronization and cell splitting for data, in accordance with certain aspects of the present disclosure. As seen in FIG. 9, synchronization channel SFN may be transmitted for timing from all cells globally. According to certain aspects, based on received RACH power, cell splitting may be achieved for data transmissions. For example, referring to FIG. 9, persistent assignment with VCI (virtual cell ID) and other configuration may be assigned to MTC such that MTC1 908 may be served by LPN1 910 and MTC2 912 may be served by multiple cells, transparent to MTC.

Figure 10:
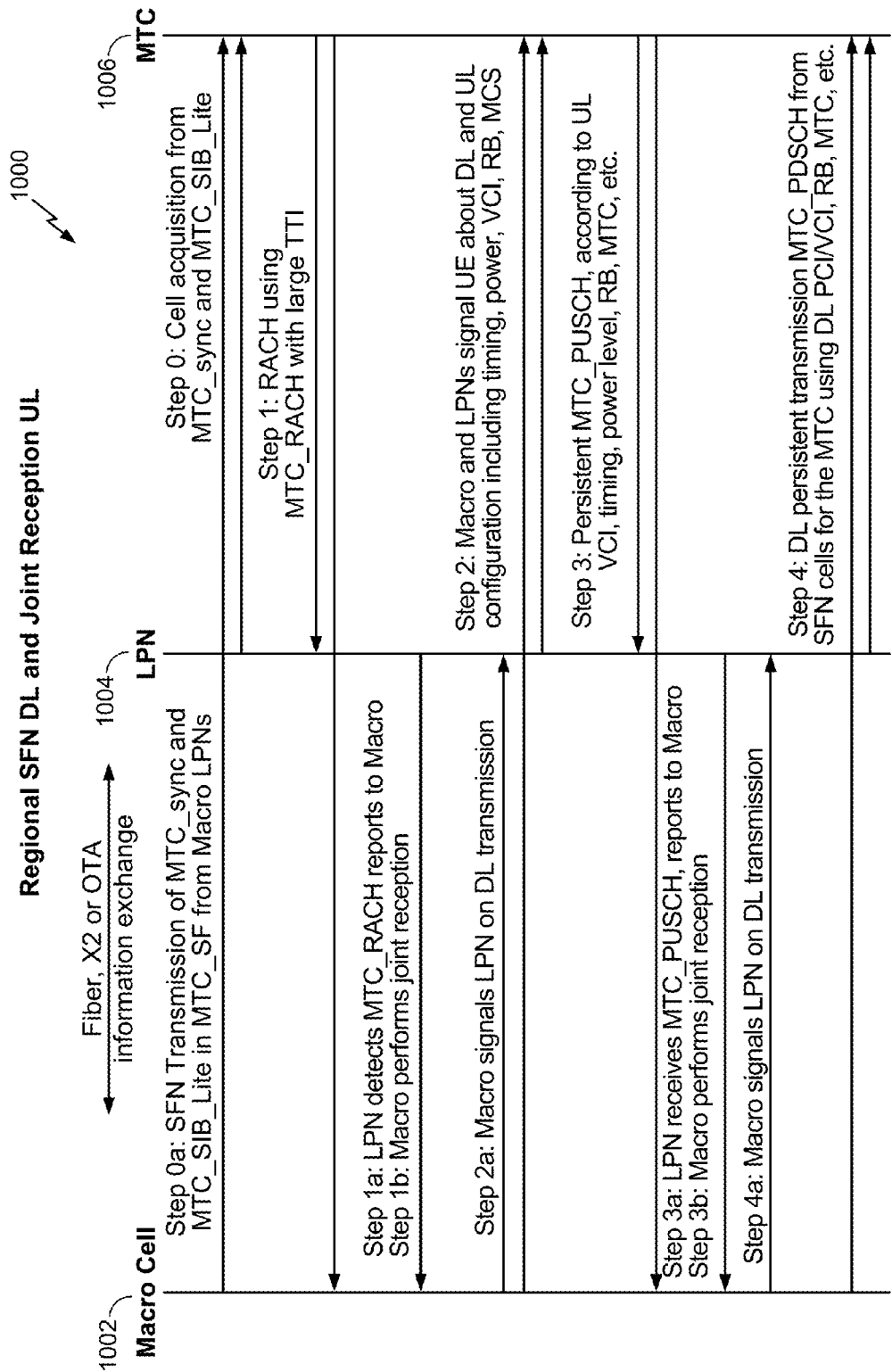
FIG. 10 illustrates an example call flow for regional SFN for all channels, in accordance with certain aspects of the present disclosure.

FIG. 10 illustrates an example call flow 1000 for regional SFN for all channels, in accordance with certain aspects of the present disclosure. At Step 0a, the Macro cell 1002 and LPNs 1004 may send SFN transmission of MTC_SYNC and MTC_SIB_LITE in MTC_SF to MTC device 1006. The MTC device 1006 may perform cell acquisition from MTC_SYNC and MTC_SIB_LITE at Step 0. At Step 1, the MTC device 1006 may send MTC_RACH with large TTI to the LPNs 1004. At Step 1a, the LPNs 1004 may detect the MTC_RACH and report it to the Macro cell 1002. At Step 1b, the Macro cell 1002 performs joint reception and at Step 2a the Marco cell 1002 signals the LPNs 1004 on the DL transmission. At step 2, the Macro cell 1002 and LPNs 1004 signal the MTC device 1006 (e.g., a UE) about DL and UL configuration including timing, power, VCI, RB, and MCS information. At Step 3, the MTC device 1006 sends persistent MTC_PUSCH, according to the signaled UL VCI, timing, power level, RB, MTC, etc. At Step 3a, the LPN 1004 may receive MTC_PUSCH and report to the Macro cell 1002. At step 3b, the Macro cell may perform joint reception and at Step 4a the Macro cell 1002 may signal the LPNs 1004 on the DL transmission. At Step 4, all SFN cells (e.g., Macro cell 1002 and LPNs 1004) send DL persistent MTC_PDSCH for the MTC device 1006 using DL PCI/VCI, RB, MTC, etc.

Figure 11:
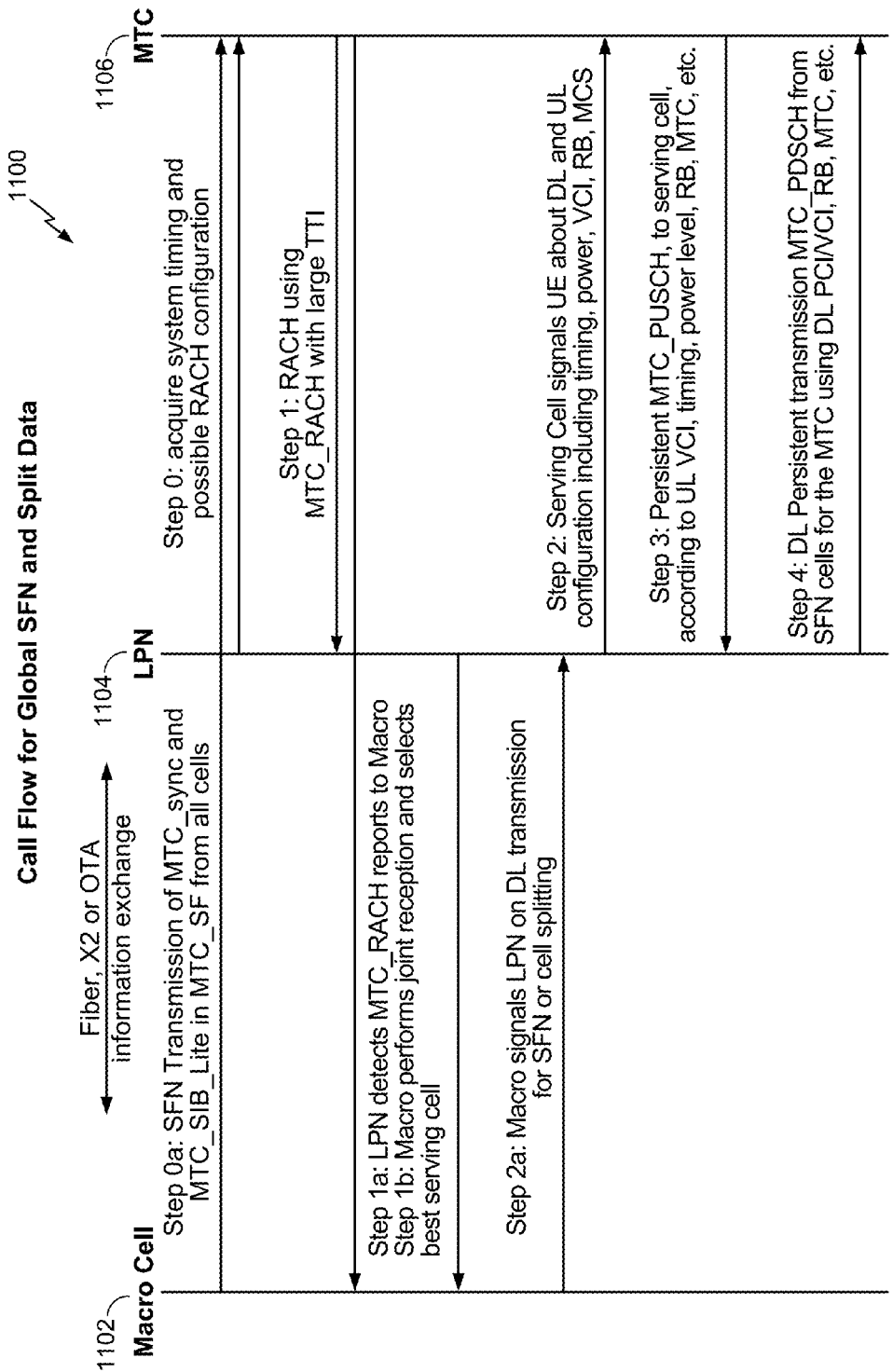
FIG. 11 illustrates an example call flow for global synchronization SFN and local split data, in accordance with certain aspects of the present disclosure.

FIG. 11 illustrates an example call flow 1100 for global synchronization SFN and local split data, in accordance with certain aspects of the present disclosure. At Step 0a, the all SFN cells (e.g., Macro cell 1102 and LPNs 1104) may transmit MTC_SYNC and MTC_SIB_LITE to the MTC device 1106 in MTC_SF. At Step 0, the MTC device 1106 may acquire system timing and possible RACH configuration from MTC_SYNC and MTC_SIB_LITE. At Step 1, the MTC device 1106 may transmit MTC_RACH with large TTI to the LPNs 1104 and Macro cell 1102. At Step 1a, the LPNs 1104 may detect MTC_RACH and report to the Macro cell 1102. At Step 1b, the Macro cell 1102 may perform joint reception and select the best serving cell. At Step 2a, the Marco cell 1102 may signal the LPNs 1104 on DL transmission for SFN or cell splitting. At Step 2, the serving cell (i.e., the selected LPN 1104 by the Macro cell 1102) may signal the MTC device 1106 (e.g., a UE) about DL and UL configuration including timing, power, VCI, RB, and MCS information. At Step 3, the MTC device 1106 may signal persistent MTC_PUSCH to the serving cell according to the signaled UL VCI, timing, power level, RB, MTC, etc. At Step 4, the SFN cells (e.g., Macro cell 1102 and LPNs 1104) may transmit persistent MTC_PDSCH on the DL to the MTC device 1106 using DL PCI/VCI, RB, MTC, etc.

According to certain aspects, extended TTI design may rely on large repetition and bundling for both DL and UL. Time-division multiplex (TDM) and frequency division multiplex (FDM) partitioning of DL broadcasting channels may be used to reduce interference. New DL broadcast signals may be repeated with long duration to allow deep coverage. For example, the minimum system information (SI) update period may be increased from 640 ms to longer for MTC_SIB.

According to certain aspects, for data, bundle size may be signaled to MTC during connection setup. For RACH and DL initial assignment, the worst case bundled transmission may be used. Multiple MTC_RACH and initial assignment configurations (e.g., TTI length, sequence time, and transmission time) may be provided in MTC_SIB or defined in the specification. In aspects, MTC with good coverage may select a lower bundle size for RACH. The MTC device may decide based on DL received signal strength or the time it averages to get a DL signal. This may reduce blind detection and resource utilization.

Figure 12:
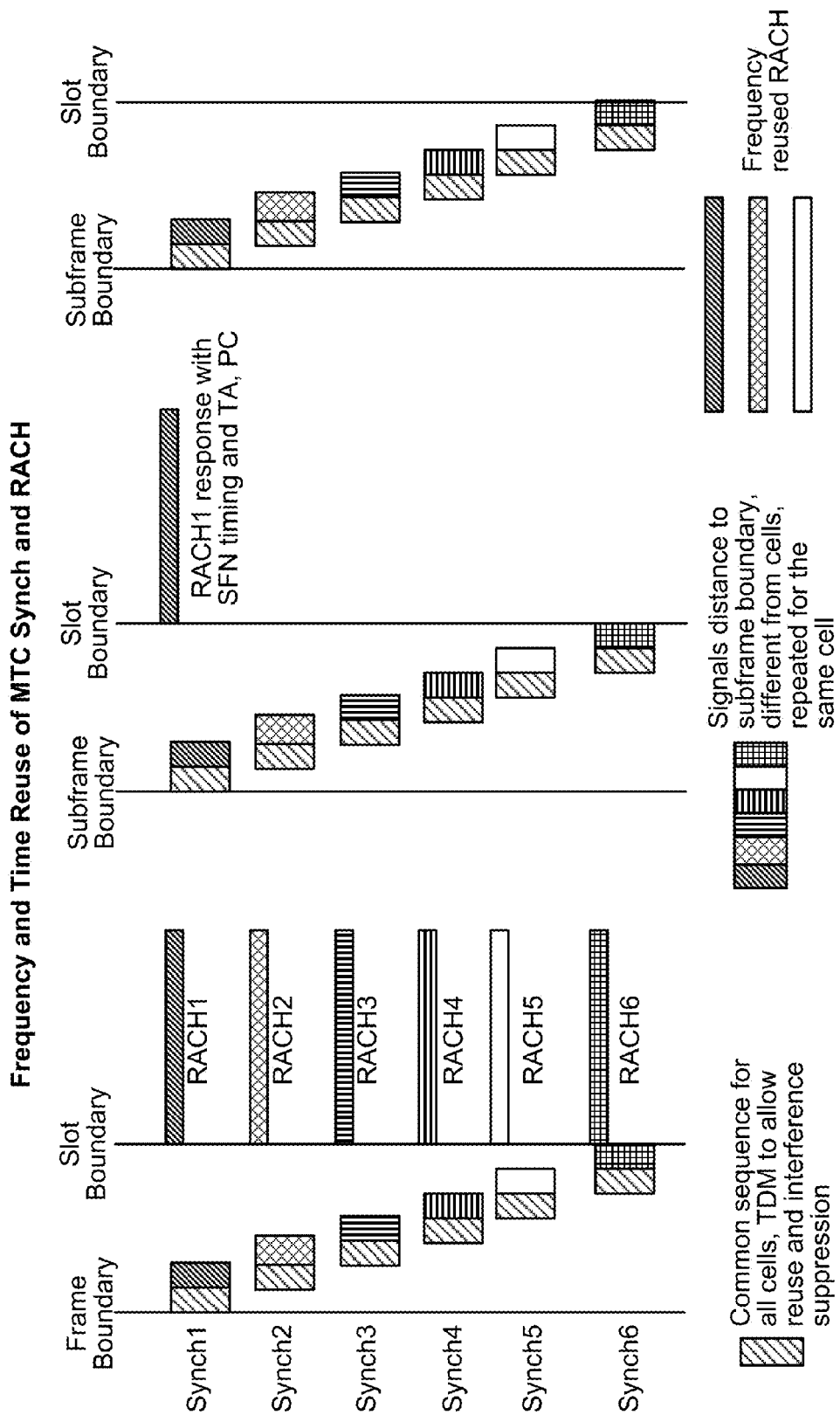
FIG. 12 illustrates time and frequency reuse of MTC synchronization and RACH, in accordance with certain aspects of the present disclosure.

FIG. 12 illustrates time and frequency reuse of MTC synchronization and RACH, in accordance with certain aspects of the present disclosure.

According to certain aspects, for MTC_PUSCH, a transmission format based on existing PUSCH/PUCCH channel structure may be used to enhance coverage. For users in good coverage, PUSCH transmission structure may be used (e.g., 1/7 symbols for pilot). For users in poor coverage, PUCCH formats 2, 3 transmission structure may be used with increased pilot overhead (e.g., 2/7 symbols for pilot). In aspects, user multiplexing may be used to improve loading. For extremely limited users, PUCCH format 1 or RACH transmission structure may be used with increased pilot overhead (i.e., 3/7 symbols for pilot). As for the above scenario, user multiplexing may be used to improve loading. In aspects, to simplify implementation, MTC_PUSCH may support 1-2 formats (e.g., similar to PUSCH with one or two MTC_RS symbols).

According to certain aspects, for MTC_PDSCH, an MTC-RS design on the DL may be used in the first slot to avoid collision with PSS/SSS/PBCH. In addition to acquisition, the MTC-RS may be used to allow improved demodulation and tracking capability. In aspects, MTC-RS may be transmitted in special MTC subframes where legacy UE is signaled as MBSFN subframes.

In aspects, MTC-RS may be transmitted using an entire symbol in the DL, similar to the PUSCH RS. Multiple symbols per slot may be assigned for MTC-RS as in UL design. Alternatively, MTC-RS only may be transmitted in the first slot, to avoid collision with PSS/SSS/PBCH. This may allow simple channel estimation averaging across multiple TTI or across frequency.

According to certain aspects, MTC-RS may be rate-matched around any legacy signal or channel.

According to certain aspects, MTC-RS may be transmitted in SFN mode from multiple cells.

Figure 13:
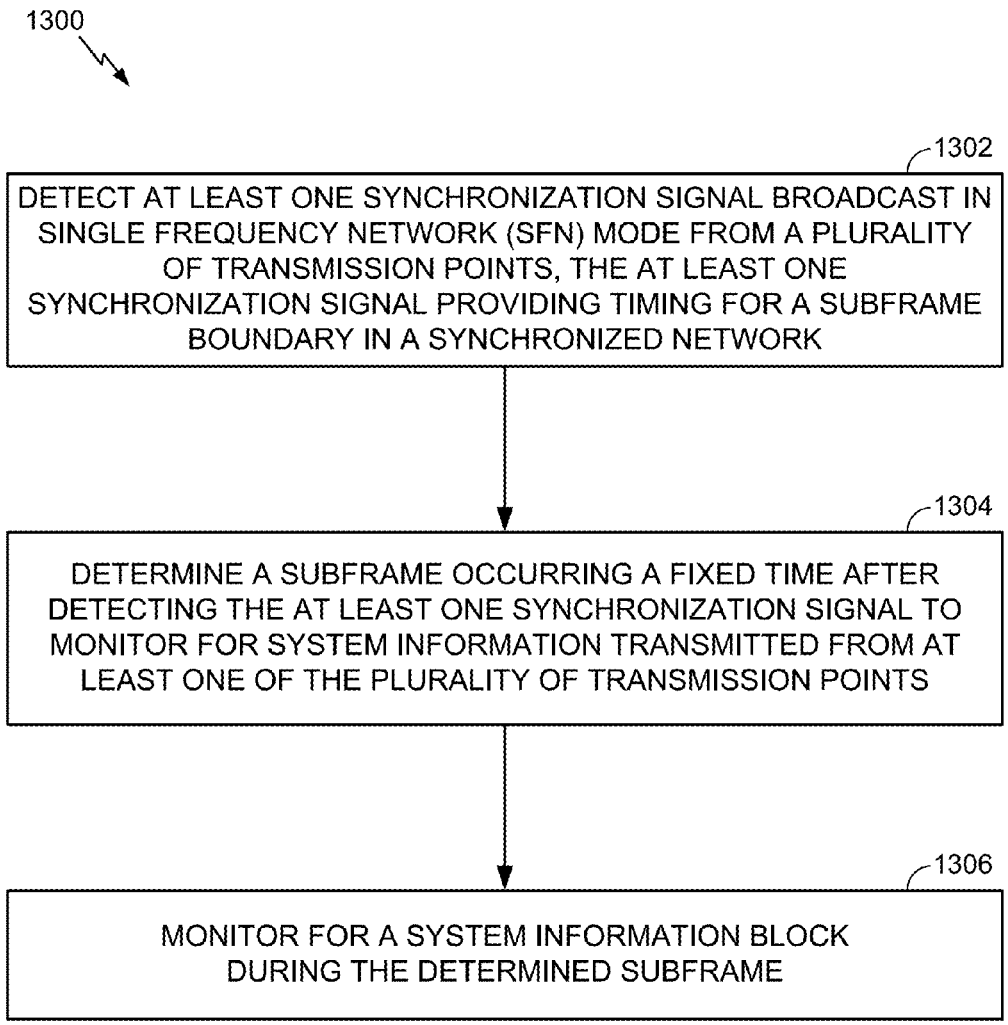
FIG. 13 illustrates example operations for wireless communications, by a UE, in accordance with certain aspects of the present disclosure.

FIG. 13 illustrates example operations 1300 for wireless communications, in accordance with certain aspects of the present disclosure. The operations 1300 may be performed, for example, by a UE (e.g., UE 120). The operations 1300 may begin, at 1302, by detecting at least one synchronization signal broadcasted in single frequency network (SFN) mode from a plurality of transmission points, the at least one synchronization signal providing timing for a subframe boundary in a synchronized network. According to certain aspects, the synchronization signals may be power boosted and/or transmitted with extended duration and/or narrow bandwidth.

At 1304 the UE may determine a subframe occurring a fixed time after detecting the at least one synchronization signal to monitor for system information transmitted from at least one of the plurality of transmission points. According to certain aspects, system information may transmitted by a plurality of transmission points (e.g., corresponding to different cell IDs) in SFN mode. Different transmission points may transmit different system information. In aspects, the transmission points may be associated with different groups having different VCI.

At 1306, the UE may monitor for a SIB during the determined subframe. According to certain aspects, the SIB may combine PBCH and SIB to convey system timing in terms of actual timing or relative timing to the next MTC subframes.

According to certain aspects, RACH may be performed at a fixed timing after SIB transmission with the transmission points. The UE may be configured with a plurality of RACH configurations with different RBs. The UE may signal different information based on the RACH configuration used. For example, the RACH configuration used may indicate a service set up or urgency of the request.

Figure 14:
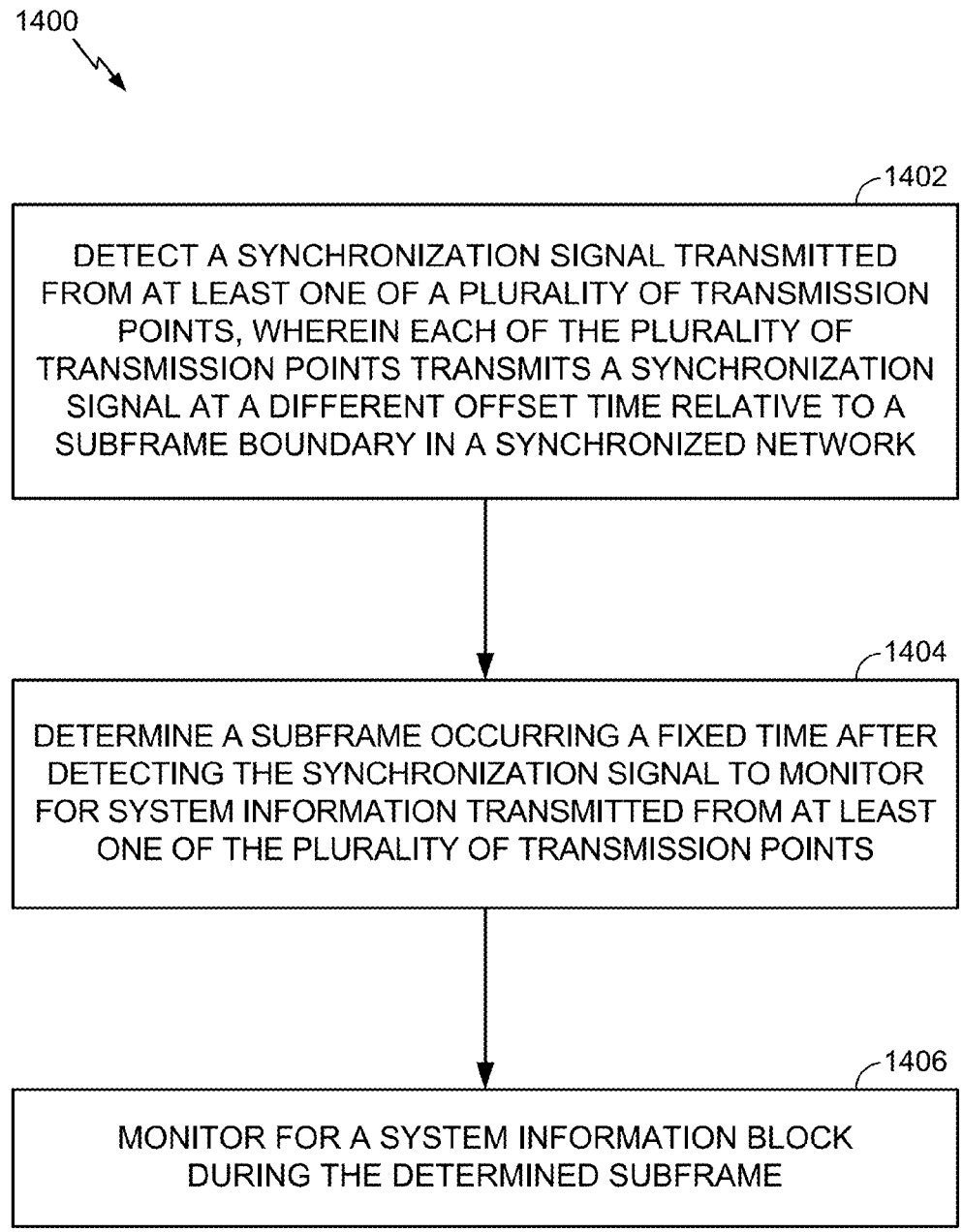
FIG. 14 illustrates example operations for wireless communications, by a UE, in accordance with certain aspects of the present disclosure.

FIG. 14 illustrates example operations 1400 for wireless communications, in accordance with certain aspects of the present disclosure. The operations 1400 may be performed, for example, by a UE (e.g., UE 120). The operations may begin, at 1402, by detecting a synchronization signal transmitted from at least one of a plurality of transmission points, wherein each of the plurality of transmission points transmits a synchronization signal at a different offset time relative to a subframe boundary in a synchronized network. According to certain aspects, the transmission points may be associated with different groups each having a different VCI. In aspects, each synchronization signal may include a portion with a common sequence transmitted by each of the transmission points.

At 1404, the UE may determine a subframe occurring a fixed time after detecting the synchronization signal to monitor for system information transmitted from at least one of the plurality of transmission points.

At 1406, the UE may monitor for a system information block during the determined subframe. According to certain aspects, the UE may perform a RACH procedure with the transmission points. During the RACH procedure, the UE may receive a response that indicated timing of the synchronized network. In aspects, after performing the RACH procedure, the UE may enter a low power state (e.g., during a plurality of subframes) and exit the low power state only during subframes dedicated for communicating with the UE (e.g., MTC_SF).

Figure 15:
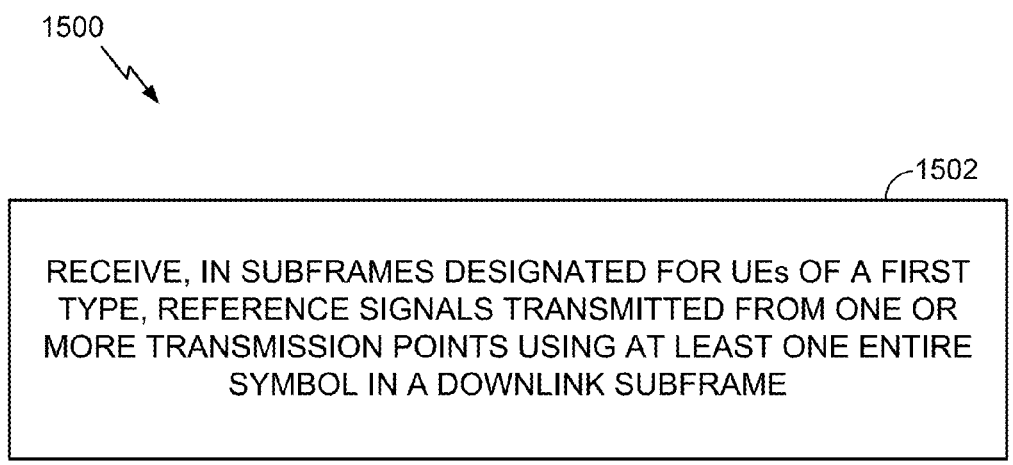
FIG. 15 illustrates example operations for wireless communications, by a UE, in accordance with certain aspects of the present disclosure.

FIG. 15 illustrates example operations 1500 for wireless communications, in accordance with certain aspects of the present disclosure. The operations 1500 may be performed, for example, by a UE (e.g., UE 120). The operations 1500 may include, at 1502, receiving, in subframes designated for UEs of a first type, reference signals transmitted from one or more transmission points using at least one entire symbol in a downlink subframe.

In aspects, multiple symbols per slot may be assigned for RSs for UEs of the first type. The RSs for UEs of the first type may be transmitted only in the first slot of a subframe. In aspects, signals for UEs of a second type may also be transmitted in the special subframes and the UE may perform rate-matching around the signals for the UEs of the second type. The RSs may be SFN transmitted from multiple cells.

Figure 16:
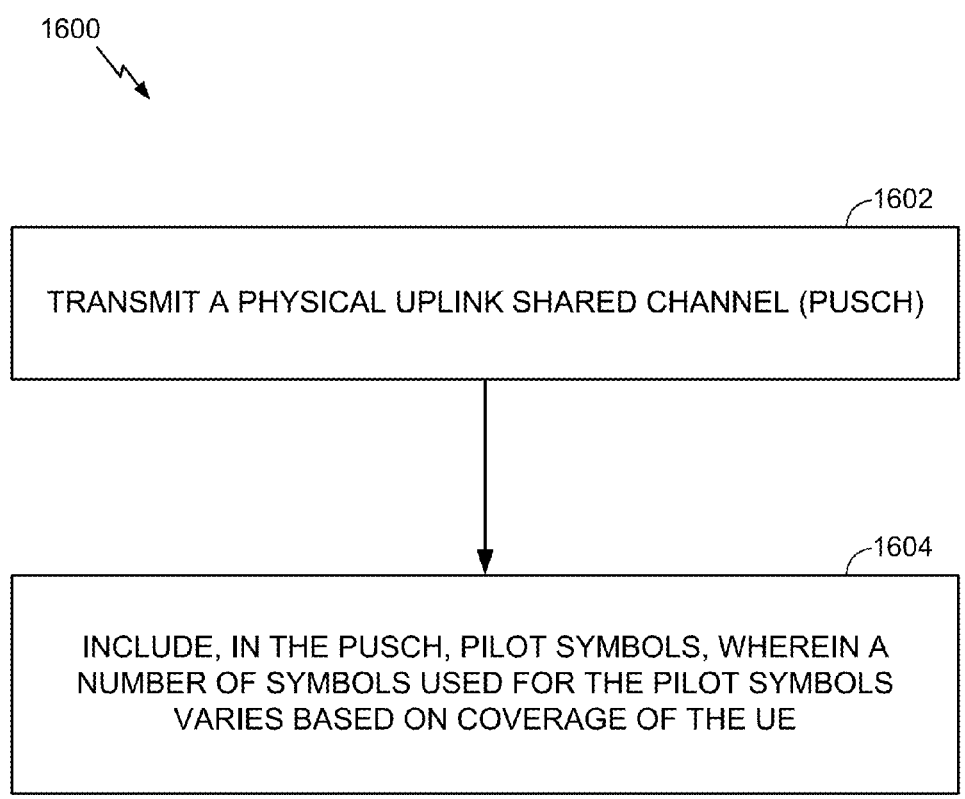
FIG. 16 illustrates example operations for wireless communications, by a UE, in accordance with certain aspects of the present disclosure.

FIG. 16 illustrates example operations 1600 for wireless communications, in accordance with certain aspects of the present disclosure. The operations 1600 may be performed, for example, by a UE (e.g., UE 120). The operations 1600 may begin, at 1602, by transmitting a physical uplink shared channel (PUSCH).

At 1604, the UE may include, in the PUSCH, pilot symbols, wherein a number of symbols used for the pilot symbols varies based on coverage of the UE. In aspects, a number of symbols used for pilot symbols for UEs with good coverage may be less than a number of symbols used for pilot symbols for UEs with worse coverage. In aspects, one out of seven symbols may be used as pilot symbols for UEs with good coverage and at least two out of seven symbols are used as pilot symbols for UEs with worse coverage. Multiplexing may be allowed to improve loading.

The techniques presented herein have been described with reference to UE-side operations (shown in FIGS. 13-16). Of course, those skilled in the art will recognize the counterpart base-station operations may also be performed (e.g., by access points, eNBs, or the like).

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory (PCM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, by a user equipment (UE), comprising:
   receiving, in downlink subframes designated for machine type communication (MTC) UEs, MTC reference signals transmitted from one or more transmission points across at least one entire symbol in the subframes; and
   receiving MTC data using the MTC reference signals.

2. The method of claim 1, wherein:
   the at least one entire symbol comprises multiple symbols.

3. The method of claim 1, wherein the MTC reference signals are transmitted only in a first slot of the subframe.

4. The method of claim 1, further comprising:
   rate-matching the MTC reference signals around the signals for non-MTC UEs.

5. The method of claim 1, wherein the MTC reference signals are received as a single frequency network (SFN) transmissions from multiple cells.

6. An apparatus for wireless communications, by a user equipment (UE), comprising:
   means for receiving, in downlink subframes designated for machine type communication (MTC) UEs, MTC reference signals transmitted from one or more transmission points across at least one entire symbol in the subframes; and
   means for receiving MTC data using the MTC reference signals.

7. The apparatus of claim 6, wherein:
   the at least one entire symbol comprises multiple symbols.

8. The apparatus of claim 6, wherein the MTC reference signals are transmitted only in a first slot of the subframe.

9. The apparatus of claim 6, further comprising:
   rate-matching the MTC reference signals around the signals for non-MTC UEs.

10. The apparatus of claim 6, wherein the MTC reference signals are received as single frequency network (SFN) transmissions from multiple cells.

11. An apparatus for wireless communications, comprising:
    a receiver configured to:
       receive, in downlink subframes designated for machine type communication (MTC) user equipments (UEs), MTC reference signals transmitted from one or more transmission points across at least one entire symbol in the subframes; and
       receive MTC data using the MTC reference signals.

12. The apparatus of claim 11, wherein:
    the at least one entire symbol comprises multiple symbols.

13. The apparatus of claim 11, wherein the MTC reference signals are transmitted only in a first slot of the subframe.

14. The apparatus of claim 11, further comprising:
    rate-matching the MTC reference signals around the signals for non-MTC UEs.

15. The apparatus of claim 11, wherein the MTC reference signals are received as a single frequency network (SFN) transmissions from multiple cells.

16. A non-transitory computer readable medium having computer executable code stored thereon for wireless communications, comprising:
    code for receiving, in downlink subframes designated for machine type communication (MTC) user equipments (UEs), MTC reference signals transmitted from one or more transmission points across at least one entire symbol in the subframes; and
    code for receiving MTC data using the MTC reference signals.

17. The non-transitory computer readable medium of claim 16, wherein:
    the at least one entire symbol comprises multiple symbols.

18. The non-transitory computer readable medium of claim 16, wherein the MTC reference signals are transmitted only in a first slot of the subframe.

* * * * *